United States Patent [19]

Weigl

[11] 3,752,375
[45] Aug. 14, 1973

[54] VEHICLE-MOUNTED BICYCLE CARRIER
[76] Inventor: William Weigl, 11033 Greenhaven Pky., Becksville, Ohio 44141
[22] Filed: Feb. 16, 1971
[21] Appl. No.: 115,340

[52] U.S. Cl. ............ 224/42.03 B, 224/29 R, 211/22
[51] Int. Cl. .............................................. B60r 9/10
[58] Field of Search .................. 224/42.1 R, 42.1 D, 224/42.1 E, 42.1 F, 42.1 G, 29, 42.03 B; 211/17, 18, 22; 248/314

[56] References Cited
FOREIGN PATENTS OR APPLICATIONS

| | | | |
|---|---|---|---|
| 864,799 | 5/1941 | France | 224/42.03 B |
| 6,611 | 3/1904 | Great Britain | 211/22 |
| 102,212 | 12/1897 | Germany | 211/18 |
| 39,064 | 7/1928 | Denmark | 211/18 |

Primary Examiner—Gerald M. Forlenza
Assistant Examiner—Jerold M. Forsberg
Attorney—William Weigl

[57] ABSTRACT

Carrier for supporting bicycles in stable, inverted vertical position on the exterior of a vehicle. Stability of the bicycles while inverted is achieved by utilizing the same three points of support used when riding a bicycle, namely, the seat and the two extensions of the handlebars. A plurality of bicycles may be carried in this fashion by nesting them in staggered front-to-back relationship on the carrier.

10 Claims, 14 Drawing Figures

Patented Aug. 14, 1973　　　　　　　　　3,752,375
3 Sheets-Sheet 1
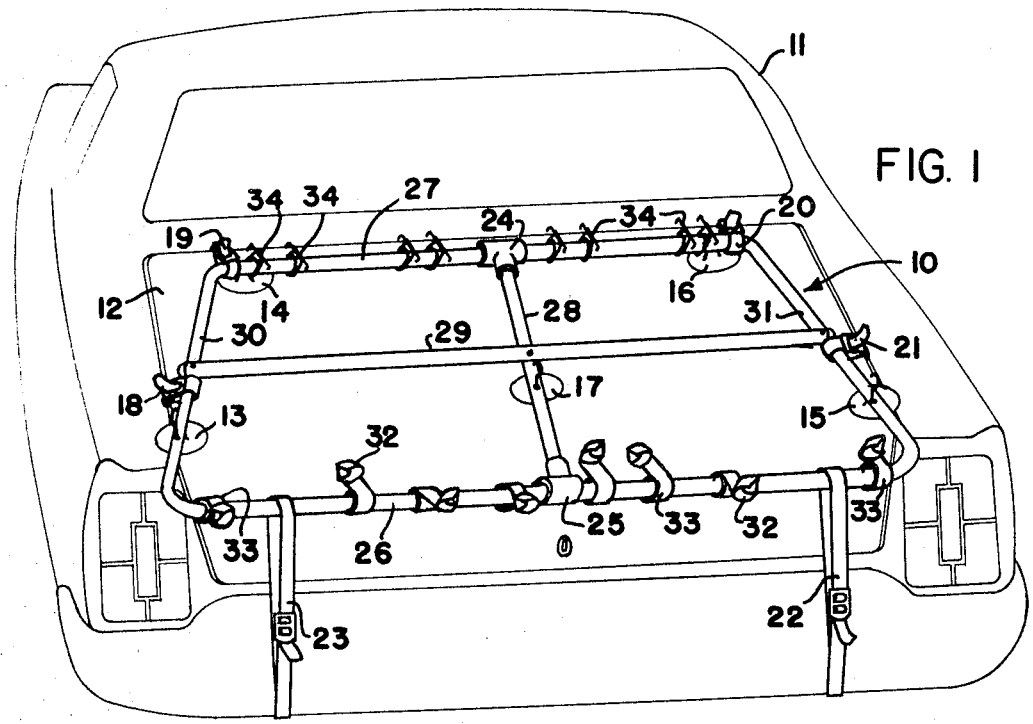
FIG. 1
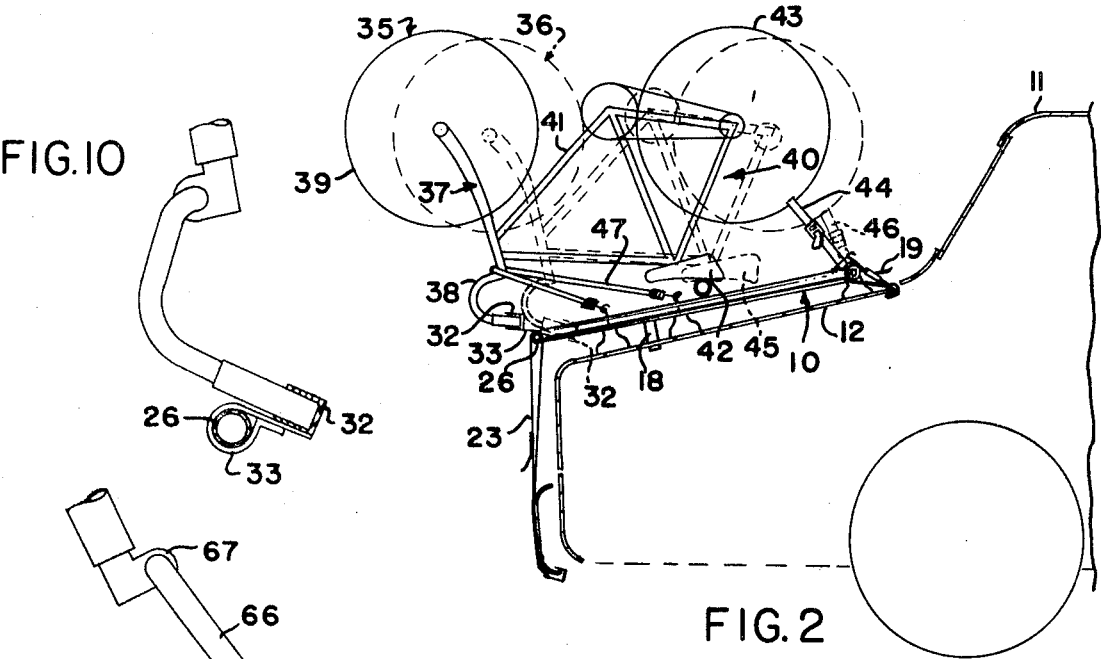
FIG. 10
FIG. 2
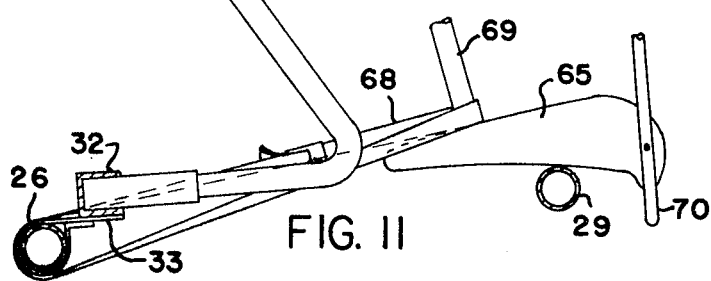
FIG. 11
INVENTOR
William Weigl Patented Aug. 14, 1973

INVENTOR
William Weigl

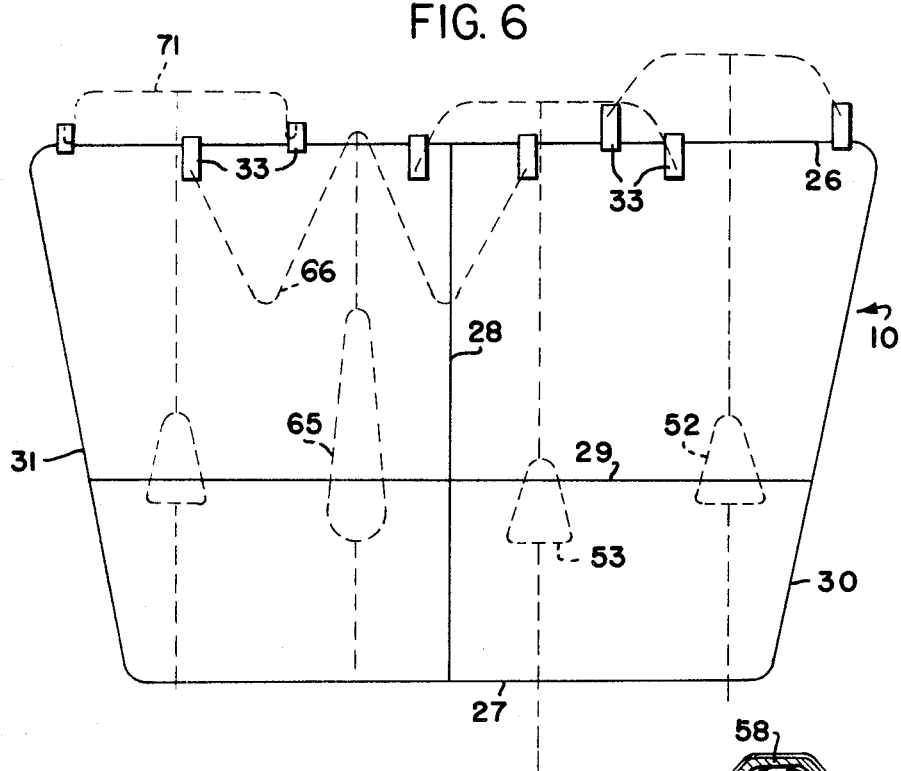
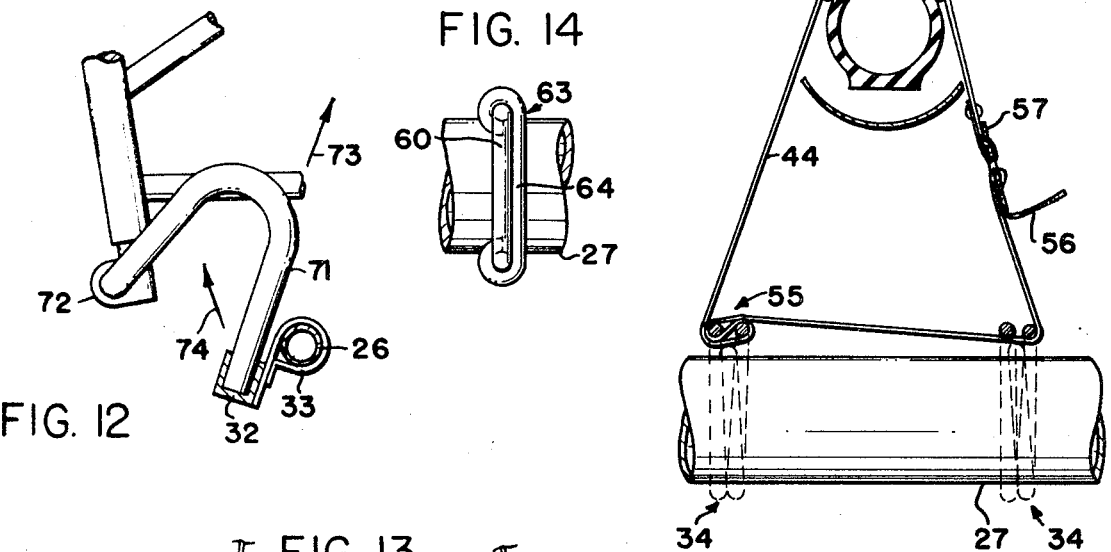
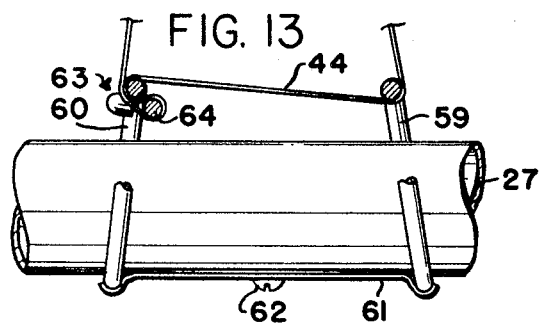

VEHICLE-MOUNTED BICYCLE CARRIER

BACKGROUND OF THE INVENTION

This invention relates to the general classification of vehicle-transported articles, and in particular to carriers for mounting bicycles on the exterior of a vehicle.

Several types of bicycle carriers are presently in use. A typical one used on autos is made of a pair of upright bars extending from the rear bumper, with rearwardly extending hooks from which the frames of one or two bicycles are suspended in upright condition, crosswise of the auto. While such a carrier is relatively simple and inexpensive, it is ordinarily limited to a maximum of two bicycles. With this type of mounting it is difficult or impossible to leave handle bar baskets, saddle bags, etc. in place while bicycles are on the carrier.

Another known type of carrier comprises a frame which is mounted on the trunk of an auto, and which carries bicycles lying on their sides with their front wheels turned at right angles to their main bodies, so that the wheels are vertical. Such a carrier is also limited to mounting a maximum of two bicycles. It is provided with clamping brackets for securing the frames of each of the bicycles and for supporting the right-angled wheels. The use of such mounting brackets and the manner of mounting the bicycles primarily by their frames presents problems in supporting the various types of bicycles now on the market, particularly the "hi-rise" or "spyder" children's bikes. Illustrative of the type of carrier herein referred to is that shown in U. S. Pat. No. 3,260,429 issued July 12, 1966. Visibility through the rear window of a vehicle whenever this type of carrier is mounted on the trunk is restricted to some extent.

SUMMARY OF THE INVENTION

A bicycle carrier is arranged to support a plurality of bicycles on the trunk of an auto, primarily by the three points of suspension for a bicycle rider, namely, the two grips of the handle bar and the seat. The bicycles are positioned in staggered front-to-back relationship on the carrier, in alignment with the vehicle, thereby minimizing obstruction of the view through the vehicle's rear window, while at the same time providing a stable support for the bicycles to enable relatively high speed travel of the vehicle. The carrier is adapted to be supported on the trunk lid of an auto by means of resilient suction cups, and is further adapted to be attached to the vehicle by means of straps connected to the edges of the trunk lid and to the rear bumper of the vehicle.

OBJECTS OF THE INVENTION

A principal object of my invention is to provide a bicycle carrier of a type having bike-mounting means which are readily adjustable to carry a variety of types and sizes of bicycles.

Another important object of my invention is to provide a vehicle-mounted bicycle carrier capable of easily and compactly carrying a greater number of bicycles than previously possible.

Still another object of the invention is to provide a bicycle carrier which utilizes for mounting stability those same three points of stability used in riding a bicycle, namely, the seat and the two grip extensions of the handle bar.

Another object is to provide a carrier for mounting bicycles which enables kick-stands, front-mounted baskets, lights, horns and mirrors to remain in place without interfering with the carrier or with the vehicle supporting the carrier.

A further object of the invention is to provide a bicycle carrier which can be mounted on the trunk-lid of an automobile, and which mounts a plurality of bicycles in alignment with the automobile in spaced-apart condition to enable visibility between the bicycles through the rear-view window of the automobile.

Another object is to provide a low-profile bicycle carrier for mounting on a substantially horizontal surface of an automobile, thereby providing a low center of gravity for the bicycles and for the portions of the carrier to which bicycles are attached.

A specific object of one feature of the invention is to provide a means for mounting a handle bar in inverted condition, with the mounting means being capable of universal adjustment and spacing to accommodate handle bars of various widths, and the various angles of their grip extensions relative to the main portions of the handle bars.

A further object of the invention is to provide a bicycle carrier capable of mounting a plurality of bicycles in staggered front-to-back relationship to enable a bicycle spacing of less than the width of the handle bars of either a pair of adjacent bicycles.

Another object is to mount a bicycle carrier on the trunk-lid of an automobile in a fashion which provides for the front portions of inverted bicycles to overhang the rear of the automobile, thereby utilizing the natural shape of a bicycle to provide a low overall height of the tops of the wheels relative to the ground level and to enable use of a relatively simple technique in placing bicycles onto the carrier.

A further specific object is to utilize the short front-to-back dimensions from a bicycle seat to the grip extensions of the handle bar for mounting a bicycle in inverted condition on an automobile-mounted carrier thereby enabling use of a carrier having front-to-rear dimensions substantially less than the overall length of standard bicycles.

Another object is to provide a novel bicycle carrier which is simple and compact in construction and inexpensive to manufacture, and which has a minimum of clamping parts for mounting bicycles thereon.

A specific object of one feature of the invention is to provide a novel mounting means for typing the bicycle frame down to a base member of a bicycle carrier.

A further object is to provide a bicycle carrier for mounting on a vehicle, in which the bicycles are mounted in-line with the vehicle to prevent wind obstruction and noises attendant therewith.

Another important object is to provide a vehicle-mounted bicycle carrier which provides bicycle stability while they are in inverted position and while the vehicle is travelling at high speeds or around curves.

A further object is to provide a bicycle carrier with bicycle-mounting means requiring no tools for mounting or demounting bicycles.

Another object is to provide a bicycle carrier for mounting on the trunk-lid of an automobile, said carrier being constructed for easy manual mounting on the vehicle and easy mounting of bicycles thereon in a very short period of time.

Other objects and advantages will be apparent from the following description and drawings.

DESCRIPTION OF THE DRAWINGS

FIG. 1 is a perspective view of an automobile with the bicycle carrier of the invention mounted on its trunk lid.

FIG. 2 is a cross-sectional elevational view of a portion of a vehicle supporting a bicycle carrier, illustrating in simplified fashion the mounting of two adjacent bicycles on the carrier.

FIG. 6 is a schematic plan representation of a bicycle carrier showing, in dotted lines, the mounting relationship of four bicycles of different types.

FIG. 9 is a view of a bicycle rear wheel strapped to the carrier, utilizing the anchoring means of FIGS. 7 and 8.

FIGS. 10, 11 and 12 are simplified representations of the manner in which the handle bars of three different types of bicycles are supported on the carrier.

FIGS. 13 and 14 illustrate a modified version of anchoring means for fastening the rear wheels to the carrier.

DESCRIPTION OF THE PREFERRED EMBODIMENT

Figure 3:
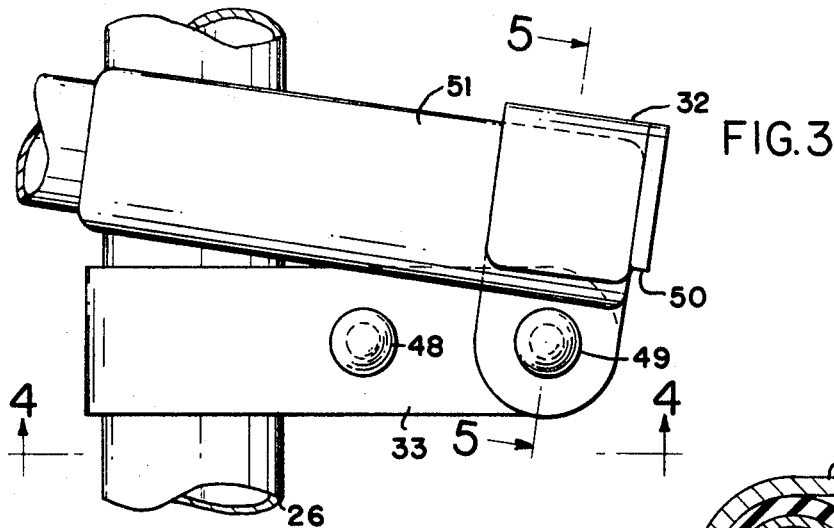
FIGS. 3, 4 and 5 are detailed enlarged views showing a preferred form of seating means for the handle grips of a bicycle handle bar.

FIG. 1 illustrates a bicycle carrier 10 carried by an automobile 11 on its rear trunk lid 12. Although it is quite feasible to mount a carrier of this general type, i.e., one which mounts bicycles in inverted position by means of their handle bars and seat, on the roof of an auto, I prefer to locate it on the trunk. This enables easier mounting of the carrier and bicycles, easier fastening of the bicycles, and provides a lower overall height from the ground level to the uppermost portion of the bicycle wheels. On the normal American sedan, this height is about 6 feet, 6 inches off the ground. This low overall dimension normally permits the auto to be parked in the average garage with bicycles in position. Roof-mounting of the bicycles prevents this possibility, even when mounted on small foreign cars. However, with certain "fast back" auto models and such small foreign cars, the only convenient location for a carrier of this type is the roof. A narrow carrier than what is shown, normally supporting only three bicycles, is all that can be safely mounted on the roof of a small foreign car. It will be apparent from the following description that my design of carrier can be readily reduced in width for this purpose.

The carrier 10 is supported on the trunk lid 12 by means of five rubber suction cups 13-17, which are so located to provide maximum stability to the carrier 10 when it is strapped down onto the vehicle by means of straps or belts 18-23. A typical trunk lid of an auto has approximately a ¼ inch spacing around its entire edge into which hooks on the ends of straps 18-21 can be inserted. Once the carrier has been properly located on the vehicle, straps 18, 19 and 20 need not be adjusted whenever subsequently relocating the carrier on the car. Only straps 21, 22 and 23 need be adjusted after that time.

In my preferred embodiment, the carrier is made of two substantially "U"-shaped sections, the legs of each "U" being received in and fastened to "tees" 24 and 25 to form the outer framework of the carrier 10. In this fashion, the two sides of the frame can be made identical, simplifying manufacture. For purposes of this description, when the two U-shaped tubular members are interconnected, the portion over the rear car bumper will be designated the "front" rail 26, whereas the portion next to the window will be designated the "rear" rail 27. These designations are related respectively to the front and rear of the bicycles they support, rather than the front and rear of the vehicle. When the carrier is mounted on the trunk, I prefer that the bicycles have their front ends facing oppositely to the direction of vehicle travel, since this provides certain advantages in mounting of the bicycles on the carrier, while at the same time it reduces the overall height to the top of the bicycle wheels.

The front rail 26 is centrally connected to the rear rail 27 by means of a cross member 28 received by and fastened to the tees 24 and 25. Within each of the tees, the ends of the U-shaped members abut each other, and are fastened to the tees by means of set screws therein. To further strengthen the structure, conventional internal splice-locks are inserted within the tubular ends of the U-shaped members to make the outer frame section of the carrier substantially unitary prior to the fastening of the tee set screws.

A center rail 29 extends fully across the width of the carrier 10 and is fastened at its midpoint to the cross member 28 and at its two ends to what shall be designated side rails 30 and 31 of the carrier. The ends of the center rail may be provided with conventional press-fitted end caps for streamlining. The center rail 29, as will be described in more detail later, provides a seat-supporting portion of the carrier, and is located rearwardly of the front rail 26 approximately twenty inches, which is a fairly standard distance between a bicycle seat and its handle grips. It is this dimension which enables the simplification of the structure into parallel tubular rails, and further enables a very short front-to-rear dimension of the overall carrier. This permits mounting of bicycles on the short span from the rear window to the back end of a vehicle, with the longest portion of a bicycle extending freely upwardly. This further allows use of universal members for supporting or seating the grip extensions of bicycle handle bars on the front rail 26, as will become apparent later.

It has been shown that the carrier 10 comprises the front rail 26, the rear rail 27, the cross member 28, the side rails 30 and 31 and the center rail 29. Carrier 10 is supported above the surface of the vehicle by the suction cups 13 through 17 and is strapped to the trunk lid 12 by the straps 18 through 21 and to the rear bumper of the auto by the straps 22 and 23. Each of the straps is of the type enabling infinite adjustment and tensioning thereof by pulling the free end of the strap through its buckle.

The front rail 26 is provided with seating members, preferably in the form of cups 32, eight of which are shown in FIG. 1, and each of which is mounted on a bracket 33. Two of such cups are provided for each bicycle, to receive the two grip extensions on the opposite ends of the handle bar. For example, the first and third cups 32 viewed from the left of the front rail 26 in FIG. 1 will support the two grips of one bicycle. Note that the cups are so positioned that they open outwardly for ease of receiving the grips. An inverted bicycle is raised into position and the grips are then slid into the cups toward the rear of the carrier until they seat in the bottoms thereof. The bicycle seat may then be lowered to rest on the center rail 29, and the rear wheel of the bicycle is positioned between a pair of anchoring members 34 to which straps are connected to tie the bicycle down to the carrier. When the anchoring members 34 have their associated straps finally tensioned, they pull the bicycle down to the carrier and compress the usual seat springs found on most bicycles to force the seat into pressure engagement with the center rail 29. This pressure engagement of the seat against the rail is important in preventing the frame and rear wheel of the bicycle from pivoting relative to the steering section of the bicycle, and the steering section is prevented from pivoting and rocking with respect to the vehicle by means of the grip extensions of the handle bars being mounted in the cups 32 on the front rail. Theoretically, it thus becomes possible with but a single strap or belt typing down the rear wheel, to tie the entire bicycle to the carrier. As will be discussed hereinafter, however, I prefer to provide additional safety means, so that the existence of one strap alone is not the sole tie for a given bicycle to the carrier 10.

Referring now to FIG. 2, which is a simplified representation of the carrier on a vehicle and a pair of standard-type bicycles mounted on the carrier, it will be seen that bicycles 35 (shown in full lines) and 36 (shown in dotted lines) are staggered in their front-to-back relationship on the carrier 10. The steering section 37 of bicycle 35 is shown comprising handle bars 38 and a front sheel 39, while the frame section 40 comprises a frame 41, a seat 42 and a rear wheel 43. The frame section and steering section are movable relative to each other only about the steering axis through the neck of the bicycle. Thus, if the extensions of the handle bars 38 are properly seated in cups 32, and if the frame section 40 has its rear wheel 43 tied down to the rear rail of the carrier 10 by means of a strap 44, thus causing the seat 42 to be in pressure engagement with the center rail 29, the bicycle is fully stabilized in all directions with respect to the carrier. As viewed in FIG. 2, the strap 44 prevents the bicycle from moving upwardly away from the carrier. It also, in conjunction with the seating of the grip extensions of the handle bars in the cups 32, prevents the frame section 40 from rocking as the vehicle corners while driving. Both of the grip extensions are solidly seated by means of the tensioning of the single strap 44. The strap also prevents pivoting of the frame section relative to the steering section, and, by means of the pressure engagement of the seat 42 with the center rail 29, further holds the entire bicycle downwardly against the carrier in firm fashion. No harm is done to a bicycle by means of the tensioning strap 44, since bicycle spokes are strong in tension as well as the compression they experience when riding. If desired, front wheel 39 can be left to rotate freely while the vehicle is moving. Bicycles are very stable mechanisms, and by utilizing the same three points for mounting a bicycle as are used in riding, i.e., the handle grips and the seat, I have provided an extremely stable system. Furthermore, the heaviest portion of the bicycle is mounted closest to the carrier, assisting in prevention of sidewardly directed forces acting on the bicycle, by providing a low center of gravity when the vehicle is turning a corner.

It will be noticed in FIG. 2 that the bicycle 36 (in dotted lines) is shown as being spaced rightwardly of bicycle 35. It is mounted in identical fashion, but its cups 32 and their mounting brackets are on the opposite side of the front rail 26, thus positioning the entire bicycle to the right. The cups 32 supporting the bicycle 36 are on the right side of rail 26, and it will be noticed that this positions its seat 45 to the rear of the seat 42 of bicycle 35. The center rail 29 has been arranged, however, to accommodate this difference in front-to-back relationship of the bicycles 35 and 36 which is due to the location of the cups 32 on opposite sides of the front rail 26. Customarily, when mounting the bicycles on the carrier, it is preferable to locate bicycle 36 in position first and tie it down by means of strap 46 before placing bicycle 35 on the carrier. The latter bicycle can then be positioned in place on the carrier by causing one of its handle grip extensions to engage between the handle bars of bicycle 36, and by fastening it to the carrier in similar fashion. Once the bicycles have been mounted, I prefer to employ the use of a rubber tensioning cord 47 which has hooks at its ends which engage with "eyes" extending from the suction cups up through the side rails of the carrier. The eyes form hooks at their upper ends. In this way I provide an added safety factor to prevent loss of a bicycle in the event its strap 44 or 46 breaks or accidentally loosens. The cord 47 would prevent the handle grip extensions from leaving the cups 32, but since the main weight of the bicycle will still be over the carrier, it will be readily noticeable to the operator that the situation needs to be corrected.

Figure 5:
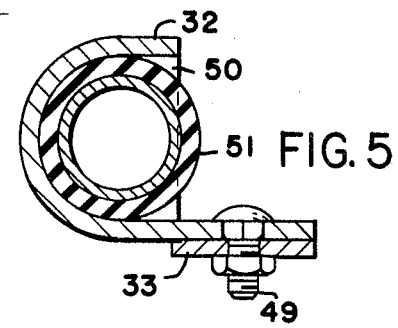
Figure 4:
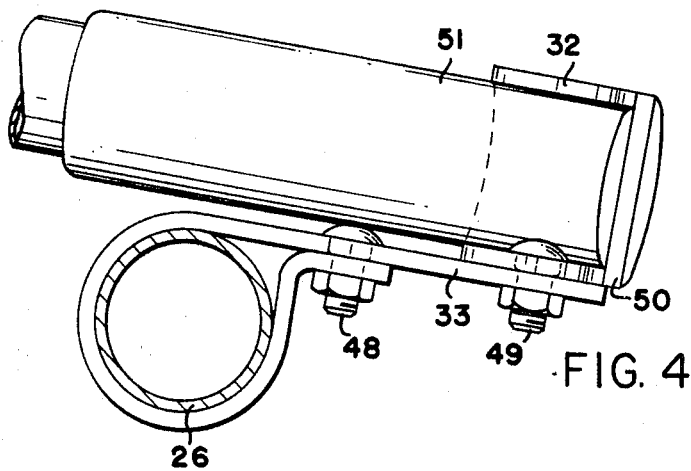

Referring now to FIGS. 3 through 5, I illustrate one form of cup which I have found quite satisfactory. It should be understood, however, that many versions or designs of seating members for grip extensions of handle bars are possible, including several types which have latch or locking members which firmly grip the extensions. FIG. 3 illustrates bracket 33 mounted on the front rail 26 and firmly clamped thereto by means of a bolt 48. The brackets 33 are adjustable along the length of the front rail 26 to accommodate different spacings of handle grips and bicycles. In addition, they are pivotal about the axis of the front rail to accommodate the different angles at which particular riders have their handle bars adjusted, or in the case of bicycles which are difficult to mount, are adapted to be adjusted for a special positioning of the handle bars prior to mounting on the carrier. The cup 32 is mounted on the bracket 33 by means of a bolt 49 which enables the cup 32 to be adjusted about the axis of the bolt. It will be seen that in this fashion, the cup 32 is universally adjustable with respect to the carrier through the combined pivotal movement of the bracket 33 about the rail 26 and the cup 32 about the bolt axis 49. Cup 32 is shown in FIGS. 4 and 5 as being substantially "C"-shaped with a back wall 50 against which the end of the handle grip extension 51 seats when bottomed in the cup. Handle grips come in several types and diameters. To facilitate the variety of grips, the "C"-shaped section is preferably capable of being enlarged or reduced in size to snuggly encompass the grips. Particularly in the case of racer model bicycles, where tape is often wrapped directly on the grip extensions and no rubber or plastic grip is used, the size of cups 32 should be reduced. For this reason, I prefer that the back wall 50 be spot-welded along its lower portion (as viewed in FIG. 4) to the cup 32, and that its upper portion be free to enable the "C" section to be reduced or expanded in size.

FIG. 6 presents a schematic plan view of the carrier to illustrate the manner in which the brackets 33 supporting the cups 32 extend on opposite sides of the front rail 26 to establish the front-to-back relationship of the bicycles illustrated in dotted lines. On roof-mounted carriers, adjacent bicycles may face in opposite directions to achieve a closer spacing therebetween. At the right side of FIG. 6, two standard bicycles are shown, with the right bicycle being mounted on brackets 33 which extend toward the rear of the vehicle, whereas the brackets 33 for supporting the next-adjacent bicycle extend toward the front of the vehicle. This displaces the bicycles in the direction of the vehicle with the rightward bicycle seat 52 engaging the center rail 29 toward the rear of the seat. Seat 53 of the adjacent bicycle engages the center rail 29 near its front. I have found that if the cups 32 are offset from the front rail 26 approximately two and one-half inches on either side thereof, a five inch total offsetting relationship from front to rear of adjacent bicycles is sufficient to properly accommodate most seats and at the same time to enable the handle bars of adjacent bicycles to interdigitate in such a fashion so as not to interfere with each other. It is particularly desirable that any handle bar-mounted basket, light, etc., on the front of the rightward bicycle of FIG. 6 in no way engage the next bicycle. In addition, the frame sections of the bicycles may be brought within 12 or 13 inches of each other without the pedals touching. Thus the bicycles may be closely nested. At the extreme left of FIG. 6, I schematically illustrate a racing model bicycle on which the handle bars are normally turned down. This requires special mounting techniques as will be discussed later in connection with FIG. 12. The bicycle illustrated in dotted lines second from the left in FIG. 6 is a "hi-rise" children's bicycle, with small wheels, "banana" seat, and high flaring handle bars. This kind of bicycle also requires special mounting treatment, and will be discussed in detail in FIG. 11. Suffice it to say for the time being that the hi-rise or banana seat bicycle can be mounted on my carrier only if there is no "sissy bar" the bicycle. A "sissy bar" is one which supports the rear of the seat from the rear axle and extends upwarely above the seat to the shoulders or head of a youthful rider. Obviously, the inverted position of such a bicycle on the surface of an automotive vehicle is impossible when the "sissy bar" is in normal position.

Figure 7:
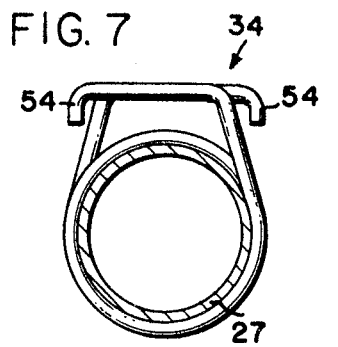
FIGS. 7 and 8 illustrate one type of anchoring means for straps used to tie down the rear wheels of bicycles to the carrier.
Figure 8:
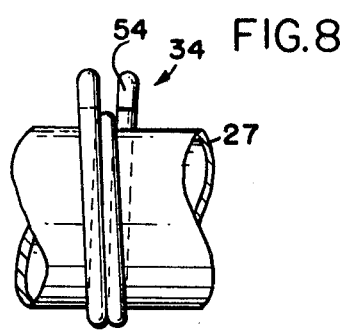

The rear wheel of each bicycle is strapped to the rear rail 27 by the anchoring means 34 which, as shown in FIGS. 7 and 8, is preferably in the nature of a spring clamp similar to a conventional hose clamp. The spring clamp 34 is mounted in frictional engagement with the rear rail 27 by slightly enlargening the opening in the clamp through use of opposing-forces on the legs 54 at the upper side of the clamp. By moving the legs 54 toward each other with pliers, the clamp opens slightly, enabling its location over the rear rail 27 and its clamping in any selected position depending on where the bicycles are arranged on the carrier. FIG. 9 shows a preferred method of tying down the rear wheel of a bicycle by means of strap 44. Tying is accomplished by wrapping the strap around the parallel, horizontal portions of one of the spring clamps and passing the free ends of the strap over the rim of the rear wheel and beneath the horizontal portion of the other clamp. A frictional grip is provided at the looped portion illustrated at 55, enabling easy tensioning of the strap to draw down the rear wheel of the bicycle to the carrier. I compress the seat springs by pulling downwardly on the free end 56, which normally is of a length to enable easy gripping thereof. The buckle 57 is draped over the rim 58 of the rear wheel, the free end of the belt threaded through the buckle 57 as shown, and the free end pulled downwardly. The looped portion 55 has a gripping effect by passing around the two horizontal portions of the spring clamp, so as to prevent the strap 44 from slipping around the spring clamps and rim 58 of the bicycle rear wheel during tensioning of the strap. This provides ample force for snugging the rear wheel down, thus tightening fast the entire bicycle, including the seat and both handle grips to the carrier.

In FIGS. 13 and 14, I illustrate a modification of the anchoring means 34 in which a pair of rings 59 and 60 are supported on the rail 27 by means of a locator strip 61 fastened to the rail by a screw 62. The location has lips at its ends to position the rings 59 and 60 a sufficient distance apart to enable proper strapping of the rear wheels of the bicycles without interfering with the rear fenders. As shown in FIG. 14, ring 60 has a member 63 at its upper end to provide a portion 64 parallel to the upper part of the ring for enabling the strap 44 to have a looped portion at the left side of FIG. 13 similar to the looped portion 55 of FIG. 9.

In schematic form in FIGS. 10, 11 and 12, I illustrate the manner in which standard, "hi-rise" and racer model bicycles respectively have their handle grips mounted in cups 32. In each of these figures, it should be understood that the carrier is in substantially horizontal position as shown in FIG. 2. It will be noted that the bracket 33 in FIG. 10 extends on the side of the front rail 26 toward the rear rail 27 of the carrier. The tangential portion of the bracket 33 is angled slightly downwardly to accommodate the normal angle at which the handle bar of a standard bicycle is set. The cup 32 in each of FIGS. 10–12 is shown simply as being located on top of the extension of the bracket 33, it being understood the cups 32 are pivotal to accommodate the flare of the handle bars.

A hi-rise bicycle is shown in FIG. 11. This type of bicycle presents unique problems because of its "banana" seat 65 and its peculiar type of handle bar 66. Ordinarily, in order to mount such a bicycle, the seat 65 must be adjusted vertically from its frame section to a specific height, and the steering section has to be turned 180° from its normal attitude. In FIG. 11 the handle grips extend in the opposite direction to that shown in FIG. 10. In addition to this, the handle bar 66 must have its usual clamping device loosened, the bars repositioned for mounting, and retightened. Since the handle bar 66 as shown points opposite to that of the standard bicycle, each cup 32 is made to have its receiving end face toward the rear of the carrier. This means that strap 44 cannot by itself hold the bicycle in position, since its normal tensioning would tend to cause the handle grips to pull out of the cups 32. This necessitates the use of an additional strap 68, which extends around the front rail 26, and to and around adjustable rod 69 to which the seat 65 is connected. In this fashion, strap 68 pulls the hi-rise bicycle to cause the handle grip extensions to seat in the cups 32, while the rear wheel is tied to the rear rail of the carrier by a strap similar to 44, but necessarily longer. For best results, strap 68 should first be completely tensioned to provide proper seating of the grips in the cups before the rear wheel is tied down to the rear rail 27. Hi-rise bicycles hav their long banana seats supported both at the front (as by 69) and at the rear by a support 70. The support 70 is in the shape of a long-legged "U," the ends of which attach to the axle of the rear sheel. This inverted "U" connects to the sides of the seat 65, and extends slightly thereabove a few inches. This sometimes presents a problem in that the extension might possibly engage the truck lid of the vehicle. To avoid this, a cushion may be placed between the center rail 29 and the seat, to raise the seat and therefore the support 70 to prevent contact of the latter with the trunk lid.

In FIG. 12, I illustrate a preferred manner of mounting a racer model bike on the carrier. In this case the brackets 33 are made to point downwardly and the cups 32, upwardly. The handle bar 71 is pivoted with respect to neck 72 to the position shown. I prefer to use a rubber cord 47 (see FIG. 2) to assist the handle grips from lifting out of the cups 62 when mounted in this position, although the cups resist lifting motion in all but the direction of the arrow 73, which is an abnormal direction. Tying down the rear wheel would tend to cause a lifting moment in the direction of arrow 74, which is resisted by the cups 32.

Having described my invention, I claim:

1. A transportable carrier for supporting a plurality of bicycles in inverted condition, each such bicycle having a frame section including a rear wheel and seat and a steering section pivotally mounted with respect to said frame section and including a front wheel and a handle bar having a grip extensions, said carrier comprising:
   a substantially low-profile horizontal base member having a horizontal rail along one side thereof,
   first means for mounting the grip extensions of each handle bar on each rail to retain its associated steering section in inverted vertical position perpendicular to said rail,
   seating members associated with said first means for restraining each bicycle against movement in the direction of extension of its grip extensions, each seating member being adjustable along said rail for varying the spacing between grip extensions and each seating member further includes a cup member and means for adjusting the cup member about an axis substantially perpendicular to the extension of the rail, to accommodate receipt of grip extensions extending at different angles, and,
   second means for securing the frame section of each bicycle to said base member to restrain the frame section against pivotal movement relative to its associated steering section.

2. A carrier according to claim 1 wherein said rail is tubular, and wherein each seating member further includes a bracket mounted for pivotal adjustment about the axis of said rail, and means for clamping said bracket in various positions of adjustment.

3. A carrier according to claim 2 wherein said bracket comprises a flat portion extending at a right angle away from and tangential to said tubular rail, and wherein said cup member is mountable on said flat portion on either side thereof for pivotal adjustment at a right angle to the rail.

4. A carrier according to claim 3 wherein the brackets for adjacent bicycles extend in opposite directions from said rail whereby the handle bars of adjacent bicycles overlap due to the front-to-back offset relation of the bicycles, thereby enabling the frame sections to be spaced more closely than the width of the handle bars of either of adjacent bicycles.

5. A bicycle carrier adapted to be mounted on a substantially horizontal trunk surface of an automobile and further adapted to mount a plurality of inverted bicycles thereon in alignment with the automobile but facing rearwardly relative thereto,
   a base,
   means for removably securing said base to said trunk surface,
   said base comprising a first horizontal rail substantially over the rear of said automobile for supporting the handle bars of the bicycles and a second rail parallel to the first rail and spaced toward the forward end of said automobile therefrom for supporting the seat of said bicycles,
   means for securing the handle bars to the first rail by means of grip extensions on each handle bar,
   said securing means including seating means emcompassing the end and all sides of each extension except that side facing outwardly toward the sides of said automobile, said seating means restraining each bicycle against movement in the direction of extension of its grip extensions, and,
   means securing the bicycles downwardly in pressure engagement with said second rail.

6. A bicycle carrier according to claim 5 wherein said means for securing said grip extensions includes a bracket for each grip extension, which bracket is angularly adjustable relative to said first rail, and wherein said seating means comprises a seating member on each bracket for receiving the ends of said grip extensions, each said seating member being angularly adjustable about an axis extending substantially perpendicular to the grip extension received therein.

7. A bicycle carrier according to claim 6 wherein a pair of adjacent bicycles are adapted to be spaced apart a distance less than the width of their handle bars by interdigitating the handle bars on said first rail, and wherein said brackets and seating members for one bicycle are mounted rearwardly of said rail and said brackets and seating members for the next adjacent bicycle are mounted forwardly of said first rail, the relative distance relationship of said first and second rails being such that said second rail is in position to support the seats of both of said adjacent bicycles.

8. A vehicle-mounted bicycle carrier for receiving and supporting in inverted condition a bicycle having a frame section including a rear wheel and seat, and a steering section pivotally mounted to said frame section and including a front wheel and a handle bar having a pair of grip extensions at its opposed ends, said carrier comprising:
   a substantially horizontal, upwardly-facing base member fastened to the vehicle,
   a pair of members on said base member engaging the ends of the grip extensions for mounting said steering section on said base member in inverted vertical position, said pair of members each including portions for restraining said steering section against lateral, vertical and rocking movement and for further restraining the steering section against movement in the direction of extension of said grip extensions, and means for securing said frame to said base member against upward movement away from said base member, against pivotal movement of said frame section relative to said steering section, and against movement of the grip extensions in a direction opposite to the direction in which they extend.

9. A bicycle carrier according to claim 8 wherein means is provided for adjustably fastening said pair of members on said base member to accommodate the handle bars of various types of bicycles and the various angles at which grip extensions extend.

10. A bicycle carrier according to claim 9 wherein said fastening means is universally infinitely adjustable.

* * * * *